United States Patent [19]
Lofdahl

[11] 4,105,481
[45] Aug. 8, 1978

[54] ENCAPSULATION METHOD FOR ELECTRICAL ELEMENTS

[75] Inventor: Clyde A. Lofdahl, Los Altos, Calif.

[73] Assignee: Raychem Corporation, Menlo Park, Calif.

[21] Appl. No.: 804,397

[22] Filed: Jun. 7, 1977

Related U.S. Application Data

[63] Continuation-in-part of Ser. No. 737,278, Nov. 1, 1976.

[51] Int. Cl.² .................. B29C 27/20; B32B 5/20; B32B 31/20
[52] U.S. Cl. .................................. 156/79; 156/85; 156/86; 174/DIG. 8
[58] Field of Search .............. 156/84, 85, 86, 79; 174/DIG. 8, 110 F, 110 E; 29/447; 338/268, 273, 274, 275, 276

[56] References Cited

U.S. PATENT DOCUMENTS

| | | | |
|---|---|---|---|
| 3,205,467 | 9/1965 | Ganci | 174/DIG. 8 |
| 3,297,819 | 1/1967 | Wetmore | 174/DIG. 8 |
| 3,396,460 | 8/1968 | Wetmore | 174/DIG. 8 |
| 3,950,604 | 4/1976 | Penneck | 174/DIG. 8 |
| 3,985,951 | 10/1976 | Harris | 174/DIG. 8 |
| 4,034,131 | 7/1977 | Rhoads | 156/85 |

*Primary Examiner*—Caleb Weston
*Attorney, Agent, or Firm*—Lyon & Lyon

[57] ABSTRACT

An improved process for encapsulating a cylindrical electrical element having lead wires emanating therefrom including the steps of enveloping said element in a heat-shrinkable polymeric tubular member whereby said lead wires extends out through the open ends of said tubular member and heating said tubular member causing it to conformingly recover around said element.

The improvement comprises:
(a) threading each of said outwardly extending lead wires through a separate hole in a laminated disc, said disc comprising a layer of polymeric material and a substantially coplanar contiguous layer of heat foamable adhesive, said threading being effected such that the adhesive layer is disposed towards the element;
(b) inserting the said disc with the lead wires threaded therethrough within the open end of said tubular member; and
(c) applying sufficient heat to cause:
 (i) the tubular member to conformingly recover around said element and said disc, and
 (ii) the foamable adhesive layer of said disc to foam and seal the interface between the periphery of said disc and the inside surface of said recovered tubular member, interface between each hole and the lead wire passing therethrough, and any remaining holes in the disc.

16 Claims, 15 Drawing Figures

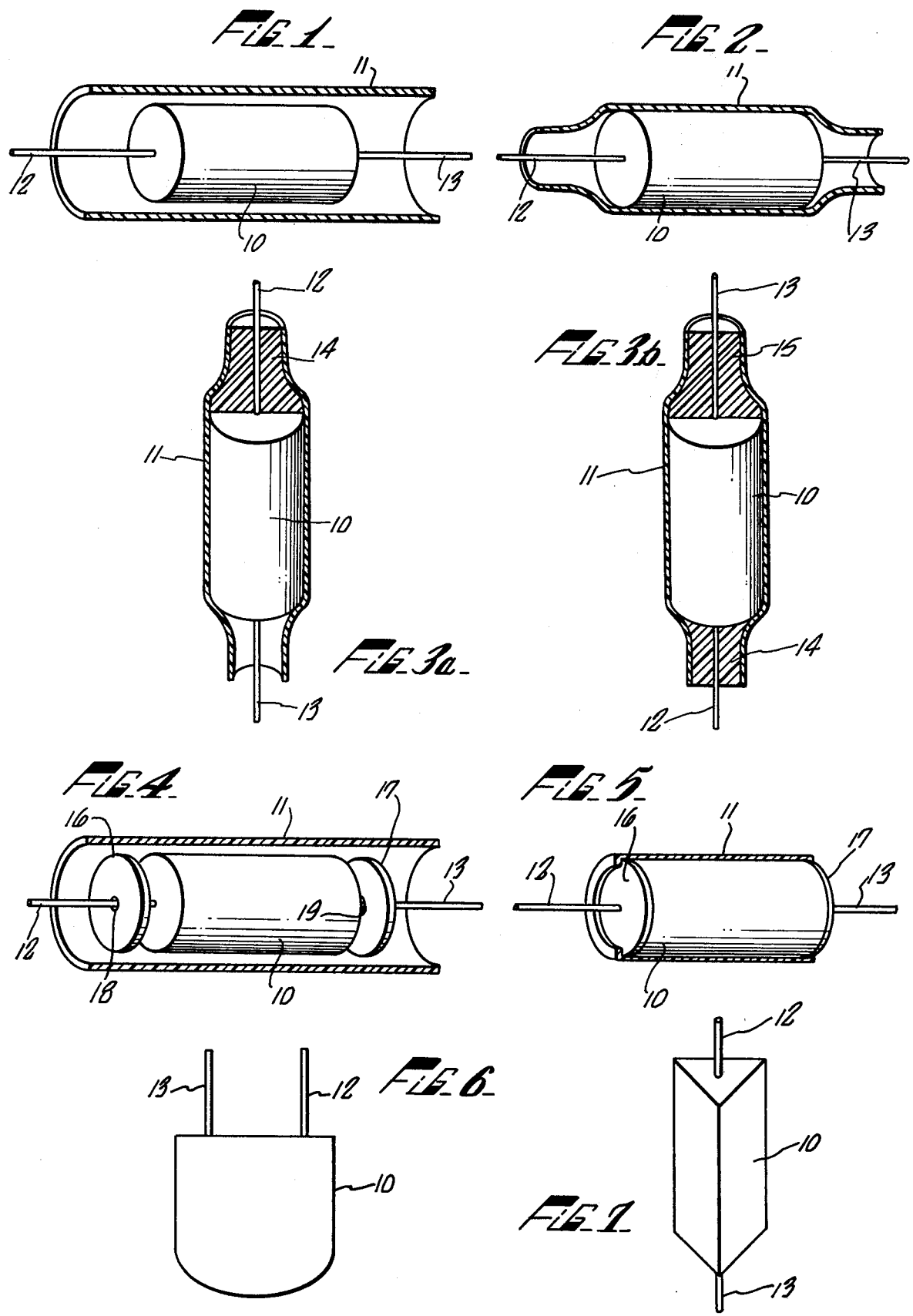

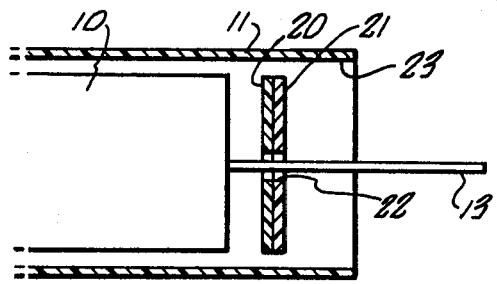
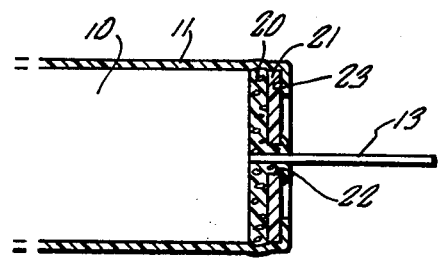
FIG. 8.    FIG. 8a.
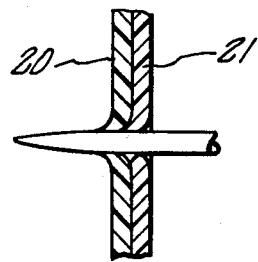
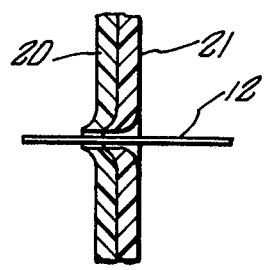
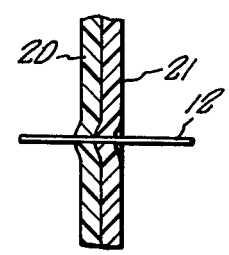
FIG. 9a.    FIG. 9b.    FIG. 9c.
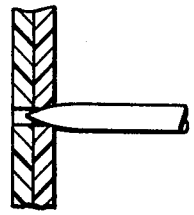
FIG. 10a.    FIG. 10b.

ENCAPSULATION METHOD FOR ELECTRICAL ELEMENTS

BACKGROUND OF THE INVENTION

This is a continuation in part of my copending U.S. application Ser. No. 737,278 which was filed on Nov. 1, 1976 entitled ENCAPSULATION METHOD FOR ELECTRICAL ELEMENTS.

BRIEF DESCRIPTION OF THE DRAWINGS

FIGS. 1, 2, 3a and 3b illustrate the prior art;

FIG. 4 illustrates an enveloping member and two discs;

FIG. 5 illustrates the member and discs in FIG. 4, sealed and encapsulated;

FIGS. 6 and 7 show other configurations of the invention;

FIGS. 8 and 8a are enlarged view of FIGS. 4 and 5, respectively;

FIGS. 9a, 9b and 9c show respectively holes being formed by a punch;

FIGS. 10a and 10b show the use of a mandrel in dilating a small hole.

Capacitors and similar small electrical components having one or more lead wires emanating therefrom are used in a wide, indeed almost infinite variety of electrical equipment and apparatus. It is highly desirable to encapsulate and environmentally seal these electrical components to enhance their reliability and service life. One of the most commonly utilized methods of encapsulation is shown in side view in FIG. 1 and entails telescoping the capacitor 10 within a heat recoverable sleeve or tube 11 with the lead wires, 12 and 13 extending out the open ends of the sleeve, which in turn extend beyond each end of the capacitor. This composite structure is then heated to an extent sufficient to cause the sleeve to shrink and conformingly recover around the capacitor as shown in side view FIG. 2. While the capacitor body is thus effectively sealed the tube ends from which the wires emerge are not sealed. The common procedure today involves sequentially filling first one open end of the tube with a material such as epoxy potting compound 14, allowing same to set, inverting the tube and filling the opposite end with potting compound 15 which is then allowed to set as shown in FIGS. 3a and 3b also in side view. This is obviously a tedious and time-consuming procedure. It would clearly be desirable to provide a method whereby both ends of the tube could be simultaneously environmentally sealed.

While the foregoing discussion and illustrative figures have been mainly couched in terms of a substantially cylindrical capacitor having a single lead wire emanating axially from each end thereof. It is to be understood that the present invention is applicable to a variety of other electrical components having one or more lead wires emanating therefrom, which components can be of a variety of dimensions and configurations. The term "cylindrical" as used herein therefore connotes brick, cube, prism, pyramidal and irregularly shaped as well as cylindrical in the classic sense of the term. The only critical limitation with respect to the configuration of the electrical elements which may advantageously be encapsulated using the method of the present invention is that they be substantially three dimensional, that is not more or less flat, essentially two dimensional articles. The ability of a heat recoverable member to shrink and recover about an article of a substantionally irregular shape enables substantially round tubes to recover about and conformingly encapsulate irregular substrate elements of cubical, brick, pyramidal or other non-circular-in-cross-section shape.

DESCRIPTION OF THE INVENTION

As heretofore indicated, the present invention is directed to an improvement in the presently known process for encapsulating a cylindrical electrical element having lead wires emanating therefrom comprising enveloping said element in a heat-shrinkable polymeric tubular member whereby said lead wires extend out through the open ends of said tubular member and heating said tubular member causing it to conformingly recover around said element.

The improved process of the present invention comprises:

(a) threading each of said outwardly extending lead wires through a separable hole in a laminated disc, said disc comprising a layer of polymeric material and a substantially coplanar contiguous layer of heat foamable adhesive, said threading being effected such that the adhesive layer is disposed towards the element;

(b) inserting the said disc with the lead wires threaded therethrough within the open end of said tubular member; and (c) applying sufficient heat to cause:
 (i) the tubular member to conformingly recover around said element and said disc, and
 (ii) the foamable adhesive layer of said disc to foam and seal the interface between the periphery of said disc and the inside surface of said recovered tubular member, the interface between each hole and the lead wire passing therethrough, and any remaining holes in the disc.

The advantages of the present process include in particular that the electrical element e.g. capacitor, can be completely sealed in a single stage. That is, it is not necessary to insert the element, heat shrink the tubular enveloping member, then fill one end with epoxy potting compound or similar material, allow same to set, and seal the other open end of the enveloping member with potting compound. In the present process both ends can be sealed simultaneously with the shrinking down of the enveloping member although, of course, if desired the shrinking and sealing steps can be done sequentially. As also shown in FIG. 4 the enveloping member 11 and the two discs 16 and 17 are appropriately positioned and then shrunk down to afford the sealed, encapsulated article as shown in FIG. 5. As shown, the discs have holes therethrough 18 and 19 appropriately positioned to receive the lead wires 12 and 13 passing therethrough.

In the embodiments shown, the electrical element is of round cylindrical form having a single axial lead emanating from each end thereof. However, as already indicated, the electrical element can be of any essentially three dimensional configuration to which the heat recoverable tube shall substantially conform on recovery. Likewise, although the sealing discs shown are round, the term disc as used herein is intended to comprehend a variety of additional shapes both regular and irregular such as shown in FIGS. 6 and 7. Additionally, the disc can be provided with a plurality of holes depending on the number of lead wires to be accommodated, again as shown in FIGS. 6 and 7. Furthermore, since the foamable adhesive seals any open holes, a disc with a plurality of holes may be used to accommodate virtually any number of lead wires thereby providing a certain amount of disc standardization. The term "disc" as used herein therefore connotes a laminated article of circular or other planar configuration comprising two layers. Referring to FIG. 8, an enlarged view of one end of FIG. 4, the layer 20 of the disc disposed towards the electrical element comprises a heat foamable adhesive. On the application of heat, the tubular member will shrink radially so as to draw down upon and conformingly encapsulate the element and each disc. Essentially simultaneously, the hole 22 in outwardly disposed layer 21 which holes and layer will be described in greater detail hereinafter, will be filled around the lead wires passing therethrough by the adhesive layer 20 as it foams and seals the interfaces between the periphery of the discs and the inside surface 23 of the recovered tubular member and also around the lead wires where they pass through the holes. This is shown in FIG. 8a. Any holes not having a lead wire passing therethrough are also sealed by the foaming adhesive, thus producing an environmental seal.

As has been indicated, the heat recoverable tubular member which envelopes the electrical element is known to the art per se. See for example U.S. Pat. No. 3,086,242. Suitable materials for such members include, for example, polyvinyl chloride, polyethylene, polyvinylidene fluoride, polytetrafluoroethylene, ethylenechlorotrifluoroethylene copolymers and ethylene tetrafluoroethylene copolymers. Such materials are conventionally rendered heat shrinkable by irradiation crosslinking followed by expansion as in the case of the tube by radially expanding the cross-linked tube. On the application of heat, the tube will shrink to or towards its original dimensions, thus conformingly enveloping the capacitor.

The polymeric layer of the disc may be likewise fabricated of a material capable of being rendered heat recoverable. That is, if deformed and then heated above its crystalline melting point, it would undergo recovery to or towards its pre-deformation configuration. In one embodiment of the invention, the disc itself is not deformed except in the hole area. That is, on the application of heat the disc itself will not have a tendency to change size or configuration. The hole or holes in the disc will, however, have been formed by deformation of the disc material and hence upon the application of heat will tend to recover towards their predeformation configuration, thereby closing up around the lead wire passing through the hole. To fabricate a heat recoverable hole all that is required is that the hole be formed by pushing aside the polymer layer, e.g. as with a punch rather than by stock removal as would occur if the hole were drilled out. In a preferred embodiment, the hole is formed by stock removal. FIGS. 9a, b, and c show respectively the hole being formed by a punch, the pre-recovery hole with the lead wire through it, and the heat recovered hole. FIGS. 10a and b show alternatively, although not preferably, how a small drilled hole can be dilated as with a mandrell to permit insertion of the lead wire. On heating the dilated hole will recover to approximately its drilled size.

As heretofore indicated, the application of heat according to the present process achieves two separate, albeit interrelated objectives. First, recovery of the enveloping tubular sleeve; second, foaming of the disc adhesive to seal the lead wire and the disc to the enveloping sleeve. When the hole area is heat recoverable, a third objective is achieved, recovery of the holes in the disc upon the application of heat. To avoid applying any more heat than necessary, it is therefore preferable, although not essential, that the recovery temperature of the sleeve and the foaming temperature of the adhesive be substantially similar. When the disc is heat recoverable,, it is preferable that the disc and sleeve be of the same or similar polymers. Foaming adhesives are ordinary adhesives to which a foaming agent has been added. Foaming agents are well known in the art. A typical foaming agent is azodicarbonamide which is sold by Uniroyal Chemical under the trademark Celogen ®AZNP. Particularly suitable ordinary adhesives are thermoplastic adhesives especially thermoplastics comprising ethylene/vinyl acetate co-polymers and terpolymers of ethylene, vinyl acetate and unsaturated organic acid terpolymers and mixtures thereof. A particularly suitable material for the sleeve and the disc polymer layer is polyethylene or polyethylene copolymers. The method of the present invention is particularly suitable for electrical elements having a diameter of about 1 to 10 mm and a length of about 5 to 25 mm.

I claim:

1. In a process for encapsulating a cylindrical electrical element having lead wires emanating therefrom comprising enveloping said element in a heat-shrinkable polymeric tubular member whereby said lead wires extend out through the open ends of said tubular member and heating said tubular member causing it to conformingly recover around said element, the improvement comprising:
   (a) threading each of said outwardly extending lead wires through a separate hole in a laminated disc, said disc comprising a layer of polymeric material and a substantially copolar contiguous layer of heat foamable adhesive, said threading being effected such that the adhesive layer is disposed towards the element;
   (b) inserting the said disc with the lead wires threaded therethrough within the open end of said tubular member; and
   (c) applying sufficient heat to cause:
      (i) the tubular member to conformingly recover around said element and said disc, and
      (ii) the foamable adhesive layer of said disc to foam and seal the interface between the periphery of said disc and the inside surface of said recovered tubular member and also the interface between each hole and the lead wire passing therethrough.

2. A process in accordance with claim 1 wherein said adhesive is a thermoplastic.

3. A process in accordance with claim 1 wherein said polymeric layer comprises polyethylene.

4. A process in accordance with claim 1 wherein said polymeric tubular member comprises polyethylene.

5. A process in accordance with claim 1 wherein said holes are formed by punching through said disc without removal of any significant portion of the material of the disc.

6. A process in accordance with claim 1 wherein said holes are formed by removal of a portion of the material of the disc.

7. A process in accordance with claim 1 wherein said electrical element has a single lead wire emanating axially from each of the two ends thereof.

8. A process in accordance with claim 7 wherein said adhesive is a thermoplastic.

9. In a process for encapsulating a cylindrical electrical element having lead wires emanating therefrom comprising enveloping said element in a heat-shrinkable polymeric tubular member whereby said lead wires extend out through the open ends of said tubular member and heating said tubular member causing it to conformingly recover around said element, the improvement comprising:
- (a) threading each of said outwardly extending lead wires through a separate hole in a laminated disc, said disc comprising a layer of polymeric material and a substantially coplanar contiguous layer of heat foamable adhesive, the portion of the polymeric layer adjacent to each said hole tending to recover upon the application of heat so as to close said hole, said threading being effected such that the adhesive layer is disposed towards the element;
- (b) inserting the said disc with the lead wires threaded therethrough within the open end of said tubular member; and
- (c) applying sufficient heat to cause:
  - (i) the tubular member to conformingly recover around said element and said disc,
  - (ii) each of said holes to shrink in size so as to conformingly close up around the lead wire therethrough, and
  - (iii) the foamable adhesive layer of said disc to foam and seal the interface between the periphery of said disc and the inside surface of said recovered tubular member and also the interface between each hole and the lead wire passing therethrough.

10. A process in accordance with claim 9 wherein said adhesive is a thermoplastic.

11. A process in accordance with claim 9 wherein said polymeric layer comprises polyethylene.

12. A process in accordance with claim 9 wherein said polymeric tubular member comprises polyethylene.

13. A process in accordance with claim 9 wherein said holes are formed by punching through said disc without removal of any significant portion of the material of the disc.

14. A process in accordance with claim 9 wherein said holes are formed by removal of a portion of the material of the disc.

15. A process in accordance with claim 9 wherein said electrical element has a single lead wire emanating axially from each of the two ends thereof.

16. A process in accordance with claim 15 wherein said adhesive is a thermoplastic.

* * * * *